Feb. 14, 1967  G. L. CAMPBELL ETAL  3,304,044
VEHICLE SEAT STRUCTURE
Filed March 29, 1965  4 Sheets-Sheet 1

INVENTORS
G.L. CAMPBELL &
A.D. HERRING

INVENTORS
G.L.CAMPBELL &
A.D.HERRING

INVENTORS
G.L. CAMPBELL &
A.D. HERRING

3,304,044
VEHICLE SEAT STRUCTURE

Gary L. Campbell and Ardis D. Herring, Waterloo, Iowa, assignors to Deere & Company, Moline, Ill., a corporation of Delaware
Filed Mar. 29, 1965, Ser. No. 443,510
12 Claims. (Cl. 248—399)

This invention relates to a seat and more particularly to an improved seat especially adapted for use in agricultural vehicles such as tractors and other self-propelled units.

The basic principles involved in vehicle seat constructions of the character referred to above are set forth in U.S. patents to Roy E. Harrington 2,840,140, patented June 24, 1958, and 2,936,818, patented May 17, 1960. Briefly, these are: a resilient link-type suspension, provision for adjustment of the suspension to accommodate riders of different weights, and ability of the seat to be moved rearwardly and upwardly so as to be out of the way when the operator desires to run the vehicle while he assumes a standing position.

The principal object of the present invention is to provide an improved seat of the nature embodying the above principles. Specifically, the objects include improved suspension means, improved latching means for releasing the seat for rearward and upward movement and improved adjustable resilient means associated with the suspension. A further object resides in a seat construction having simple and economical design features while at the same time providing operating comfort and other advantages expected to be found in more complicated and expensive seats.

The foregoing and other important objects and desirable features inherent in and encompassed by the invention will become apparent as a preferred embodiment of the invention is disclosed, by way of example, in the ensuing description and accompanying sheets of drawings, the figures of which are described below.

Figure 1:
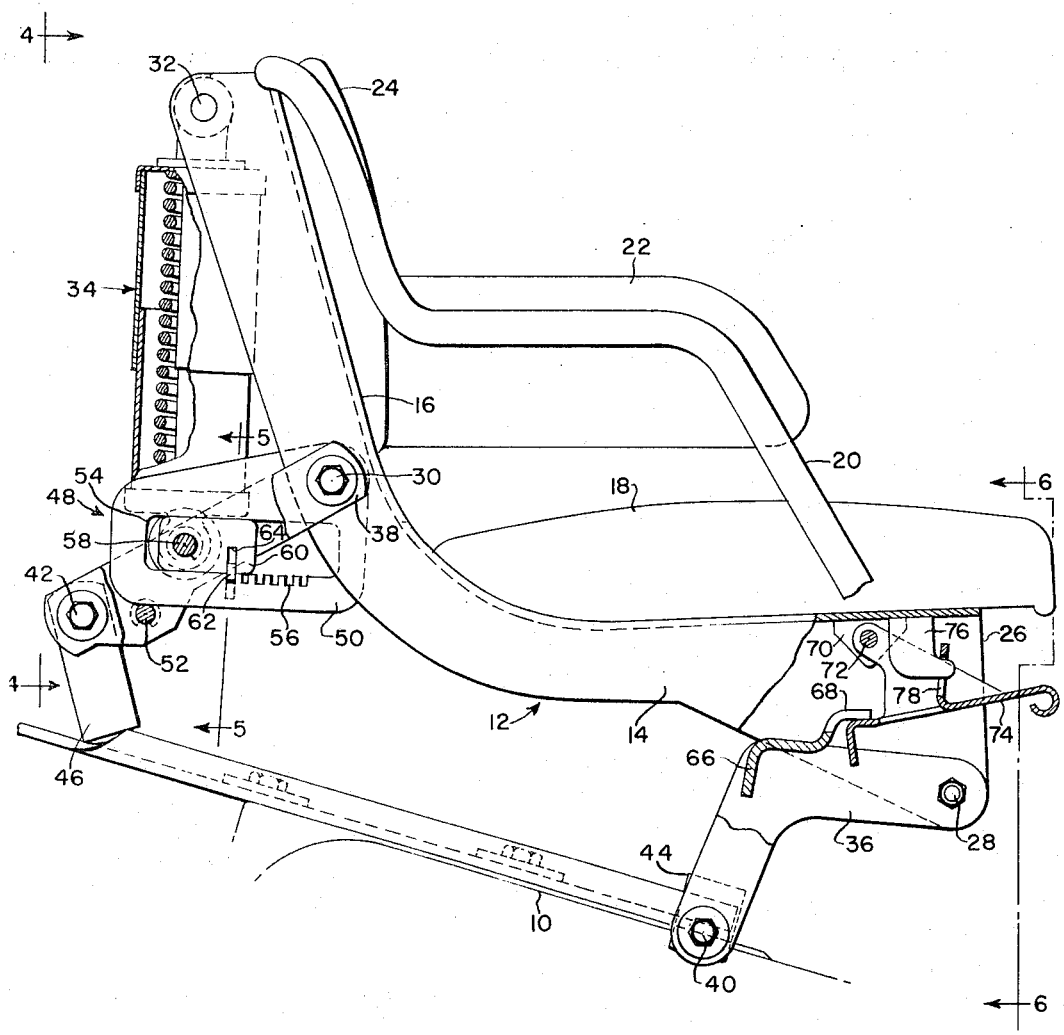
FIG. 1 is a side elevation, with portions broken away and other portions shown in section, illustrating the seat in its normal unloaded condition.

The patents referred to above illustrate the basic environment of a seat in a typical vehicle. In the case of a tractor, for example, the seat will be carried by a rearward support means, such as that designated generally by the numeral 10 here. This support means will run fore and aft or lengthwise of the vehicle, and will be rearwardly of a platform or other standing area at which the vehicle controls are situated. These controls are within convenient reach of the operator, whether he be seated or standing.

The seat here is designated generally by the numeral 12 and has a lower fore-and-aft part 14 and a rear part 16 rising from the lower part. The lower part carries a typical seat cushion 18 and a combination armrest and seat back frame 20 is secured to both parts 14 and 16. This frame has at opposite sides padded armrests 22 and further has in front of the rear part 16 a back cushion 24. The seat structure is but representative of many types that could be employed.

Figure 4:
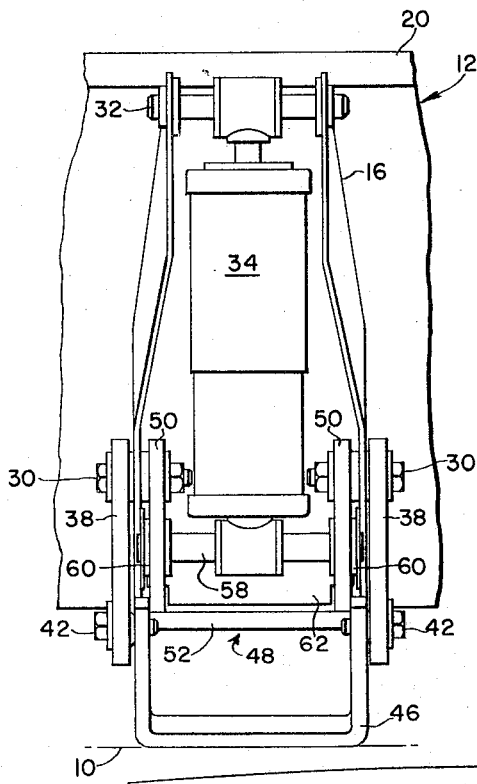
FIG. 4 is a fragmentary rear view as seen along the line 4—4 of FIG. 1.
Figure 5:
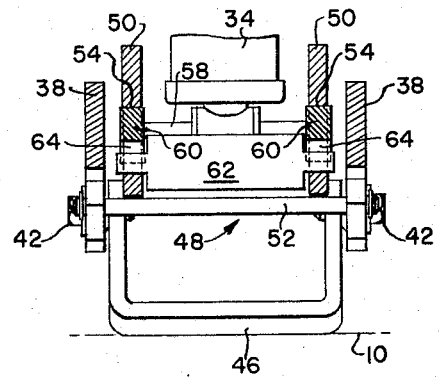
FIG. 5 is a fragmentary sectional view as seen along the line 5—5 of FIG. 1.
Figure 6:
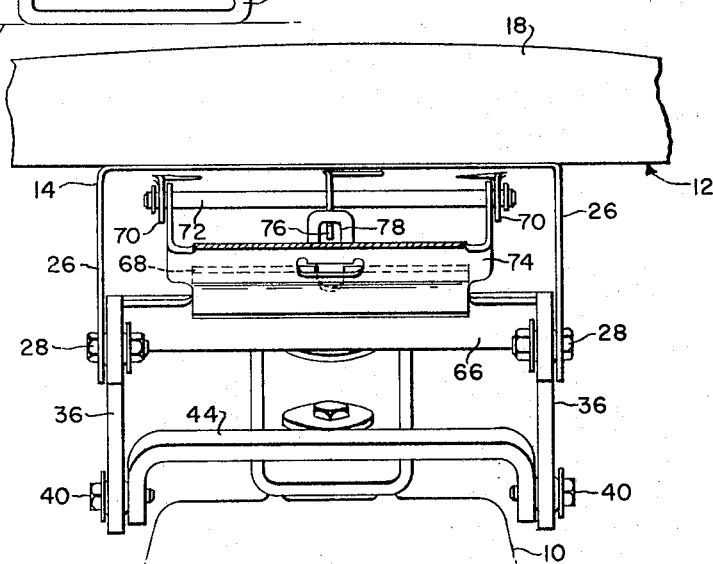
FIG. 6 is a fragmentary front view, partly in section, as seen along the line 6—6 of FIG. 1.

As best seen in FIG. 6, the parts 14 and 16 are included in a basic inverted channel, the lower part having at its forward end a pair of depending portions 26 apertured to afford coaxial pivots 28. At that portion of the structure in which the part 14 curves upwardly and rearwardly into the part 16, rear coaxial pivots are provided at 30; and at the extreme upper end of the rear part 16 is a cross pin 32 which affords an upper connection for the top end of an expansible and contractible spring-loaded device 34, here a combination shock absorber and coil spring unit of typical construction, representative of which are those shown in the above-noted Harrington patents. It is characteristic of a unit of this type that the coil spring biases the unit against contraction and the shock absorber damps undesirable vertical movement of the seat as it moves up and down about front and rear links 36 and 38 connected respectively to the front and rear pivots 28 and 30 and to front and rear pivots 40 and 42 respectively on the support means 10. As best seen in FIG. 6, there are two similar front links 36, and the support means 10 has a transverse member 44 with downturned opposite ends to receive the front pivots 40. FIG. 4 shows that the support means has a cross member 46 with upturned ears to receive the pivots 42. The front links 36 are preferably in the form of bell cranks, for purposes to be explained below. Considered broadly, the links establish a so-called parallel-link suspension by means of which the seat is supported for up-and-down movement, cushioned by a lower connection 48 of the shock absorber unit 34 to the rear links 38.

The lower connection 48 acts on the rear links 38 intermediate the pivots 30 and 42, and it is a feature of the invention that this lower connection is adjustable fore and aft to vary the moment arm about the pivot axis at 30. This is afforded by providing a pair of parallel fore-and-aft link members 50 carried by the pivot 30 and extending rearwardly to rear end portions supported, in the normal position of the seat, by a cross member 52 that spans rear portions of the suspension links 38. Each link member 50 has a fore-and-aft slot 54 having a lower notched or toothed edge 56. A cross pin 58, carried by the lower end of the shock absorber unit 34, is fitted to each end with a block 60, and these blocks are respectively carried for fore-and-aft sliding in the link member slots 54. The fore-and-aft position of the blocks 60 is established by a lock member or cross plate 62 having opposite ends reduced in vertical dimension and carried by slots 64 respectively in the blocks 60. The reduced end portions of the lock 64 are also selectively receivable in any one of the laterally paired teeth or notches 56 in the link members 50. When the lock is manually raised, it clears the link member notch so as to enable fore-and-aft shifting of the blocks 60 to a new position, after which the lock is released to remain in the lock slots 64 while engaging a new pair of teeth or notches.

Figure 3:
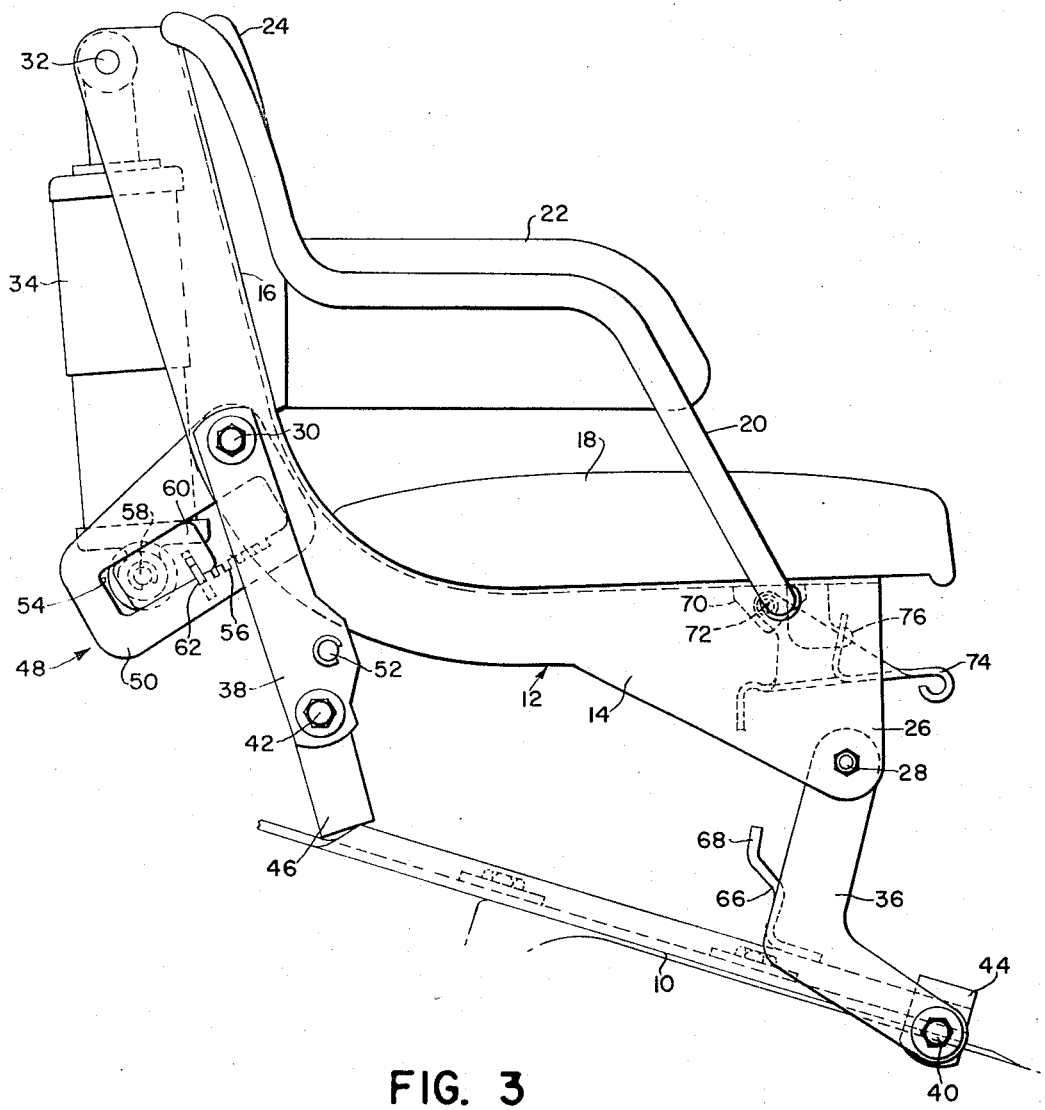
FIG. 3 is a similar elevation showing the seat in its upward and rearward position.

Adjustable positioning of the connection 48 along the slots in the link members 50 enables variation in the moment arm about the pivot 30 so as to vary the resiliency of the seat according to the weight of the operator, a principle explained in the Harrington patents noted above. In the normal position of the seat as shown in FIG. 1, the slots 54 are generally horizontal and enable adjustment of the connection without appreciably changing the spring load in the unit 34. The provision of the connection in association with the link members 50 rather than directly on the suspension links 38 has the further advantage that the link members 50 rest on the cross pin 52 rather than being permanently connected thereto. This enables separation of the link members 50 from the pin 52 during maximum upward swinging of the seat (FIG. 3). If the link members were permanently affixed to the links 38, it would require undue extension of the unit 34.

When an operator sits on the seat in the position of FIG. 1, his weight will depress the seat as the suspension links rock in a clockwise direction, or downwardly and forwardly. The weight of the operator will be resiliently carried by the unit 34 acting through the connection 48 on the rear suspension links 38. The operator is thus afforded a cushioned ride. When he rises from the seat, movement of the seat upwardly is limited by latch means cooperative with the front suspension links 36. These links are rigidly cross connected by a transverse bar 66 having a forwardly projecting lip 68. The lip is notched to accommodate ear means 70 that depend from an under front portion of the seat lower part 14. That is to say, when the seat is fully depressed, the ear means 70 are enabled to enter the notched lip rather than to interfere with it. The purpose of the ear means is to carry a transverse pivot 72 on which is supported a latch 74, to fore part of which serves as a handle convenient to the operator and the rear part of which is engageable with the lip 68 in the position of the seat in FIG. 1.

Figure 2:
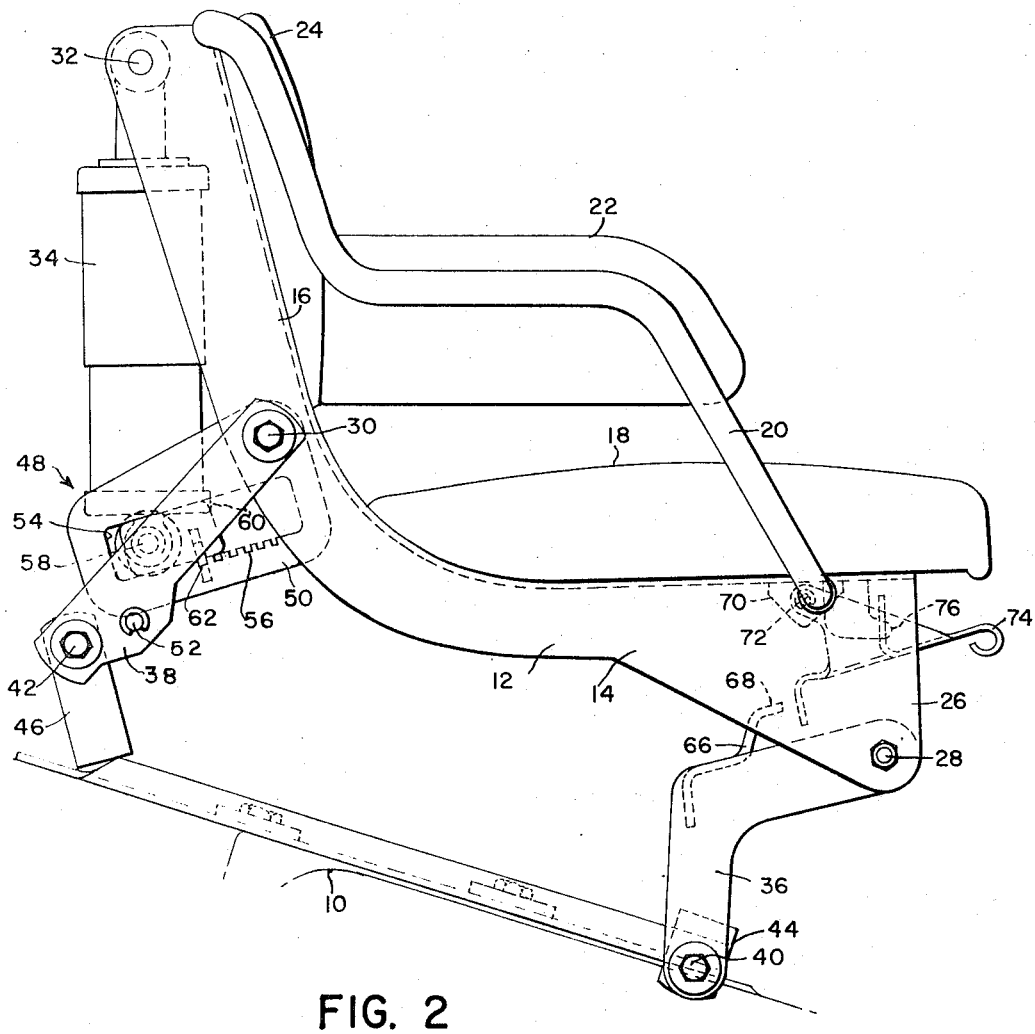
FIG. 2 is a side elevation showing the position of the seat just after its latch has been released to enable it to swing upwardly and rearwardly.

The operator may release the latch 74 by lifting its forward end, causing it to pivot in a counterclockwise direction so as to remove its rear end from beneath the lip 68. The operator then rises from the seat, if he has not already done so, and lifts the seat so that it swings upwardly and rearwardly to the position of FIG. 3. FIG. 2 shows the position of the seat just after the latch 74 has been released from the lip 68. In the FIG. 3 position of the seat, the rear portion of the cross bar 66 between the front suspension links 36 engages the support means to afford a stop. Both suspension links swing rearwardly overcenter as respects the support pivots 40 and 42, so that manual effort is required in a forward direction to return the seat to the position of FIG. 1. As the seat so returns, the rear end of the latch readily passes under the lip 68 until the seat reaches the position of FIG. 1. Movement of the latch 60 is limited by a depending tang 76 on a fore part of the seat, and the latch 74 has an upwardly turned apertured ear 78 for loosely receiving the nose of the tang. It is another characteristic of the structure that when the seat is moved to its FIG. 3 position, the link members 50 in the connection 48 leave the cross pin 52 between the rear suspension links 38. When the seat is returned to its FIG. 1 position, the link members 50 of course re-engage the pin 52.

As will be seen, the seat structure utilizes simple suspension linkage and employs parts of these linkages in conjunction with the latch 74 and the adjustable connection 48, thereby simplifying the overall construction and making it economical to manufacture and efficient in operation.

Features and advantages other than those enumerated will readily occur to those versed in the art, as will many modifications and alterations in the preferred embodiment disclosed, all without departure from the spirit and scope of the invention.

What is claimed is:

1. Vehicle seat structure, comprising: fore-and-aft support means; a seat including a lower part and a rear part rising from said lower part; mounting means connected between the support means and the seat and mounting the seat above the support means for up-and-down movement of said seat relative to said support means in a rider-carrying range and for upward and rearward movement to a rear position out of said range, said mounting means including a first set of front and rear transverse pivots spaced apart fore and aft on the support means, a second set of front and rear transverse pivots spaced apart fore and aft on the lower seat part and spaced respectively ahead of the front and rear pivots of said first set when the seat is in its rider-carrying range and front and rear link means connected respectively between the two front pivots and the two rear pivots; and means for yieldingly supporting the seat in said rider-carrying range, including an expansible and contractible device biased against contraction and having an upper end including a connection to an upper portion of the seat rear part and a lower end including a connection to a portion of the rear link means intermediate the rear pivots.

2. The invention defined in claim 1 in which: the connection of the device to the rear link means is adjustable lengthwise of said rear link means.

3. The invention defined in claim 1, in which: releasable stop means is engageable to limit upward movement of the seat in its rider-carrying range to a position in which a straight line through the rear pivots inclines upwardly and forwardly from the support means rear pivot and the connection of the device to the rear link means is adjustable along the rear link means in a fore-and-aft path intersecting said line.

4. The invention defined in claim 1, in which: the connection of the device to the rear link means is separable from the rear link means incident to movement of the seat to its rear position.

5. The invention defined in claim 1, including: releasable latch means cooperative between the seat lower part and the front link means and operative when engaged to limit upward movement of the seat to a predetermined height in said rider-carrying range and operative when released to enable movement of the seat to its rear position.

6. The invention defined in claim 5, in which: the front link means includes a pair of transversely spaced members and a transverse cross-connecting member joined thereto, and the latch means is movably connected to the seat lower part for selective engagement with and disengagement from said cross-connecting member.

7. The invention defined in claim 1, in which: the rear link means includes a pair of transversely spaced apart link members and a cross member supported thereby, the connection of the lower end of said device includes an element pivoted at the seat rear pivot and extending rearwardly to and sustained by the cross member and the lower end of said device acts downwardly on said element.

8. The invention defined in claim 7, in which: said element includes a fore-and-aft slot and a member is slidable in said slot and carries the lower end of said device, and means is provided for selectively positioning said slidable member in the slot.

9. The invention defined in claim 8, in which: said element has tooth means spaced apart along a portion thereof defining one edge of the slot and the selectively positioning means includes a lock part selectively receivable by the tooth means.

10. The invention defined in claim 9, in which: the slidable member has similar tooth means selectively receivable of said lock part.

11. Vehicle seat structure, comprising: fore-and-aft support means; a seat including a lower part and a rear part rising from said lower part; mounting means connected between the support means and the seat and mounting the seat above the support means for up-and-down movement of said seat relative to said support means in a rider-carrying range and for upward and rearward movement to a rear position out of said range, said mounting means including a first set of front and rear transverse pivots spaced apart fore and aft on the support means, a second set of front and rear transverse pivots spaced apart fore and aft on the lower seat part and spaced respectively ahead of the front and rear pivots of said first set when the seat is in its rider-carrying range and front and rear link means connected respectively between the two front pivots and the two rear pivots; and means for yieldingly supporting the seat in said rider-carrying range, including a generally upright compression spring connected between an upper portion of the seat rear part and the rear link means intermediate the rear pivots.

12. The invention defined in claim 11, in which: the rear link means includes a pair of transversely spaced apart link members, the connection of the spring to said rear links includes an element pivoted on the seat between the rear links and sustained by said rear links intermediate the rear pivots.

References Cited by the Examiner

UNITED STATES PATENTS

| | | | |
|---|---|---|---|
| 2,606,592 | 8/1952 | McIntyre | 297—303 X |
| 2,829,703 | 4/1958 | Knoedler | 248—400 X |
| 2,840,140 | 6/1958 | Harrington | 248—400 X |
| 3,049,330 | 8/1962 | Coons et al. | 248—421 X |
| 3,178,148 | 4/1965 | Manke | 248—399 |

CLAUDE A. LE ROY, *Primary Examiner.*

R. P. SEITTER, *Assistant Examiner.*